No. 720,749. PATENTED FEB. 17, 1903.
C. SONDEREGGER.
DREDGING MACHINE.
APPLICATION FILED AUG. 25, 1902.
NO MODEL. 3 SHEETS—SHEET 1.

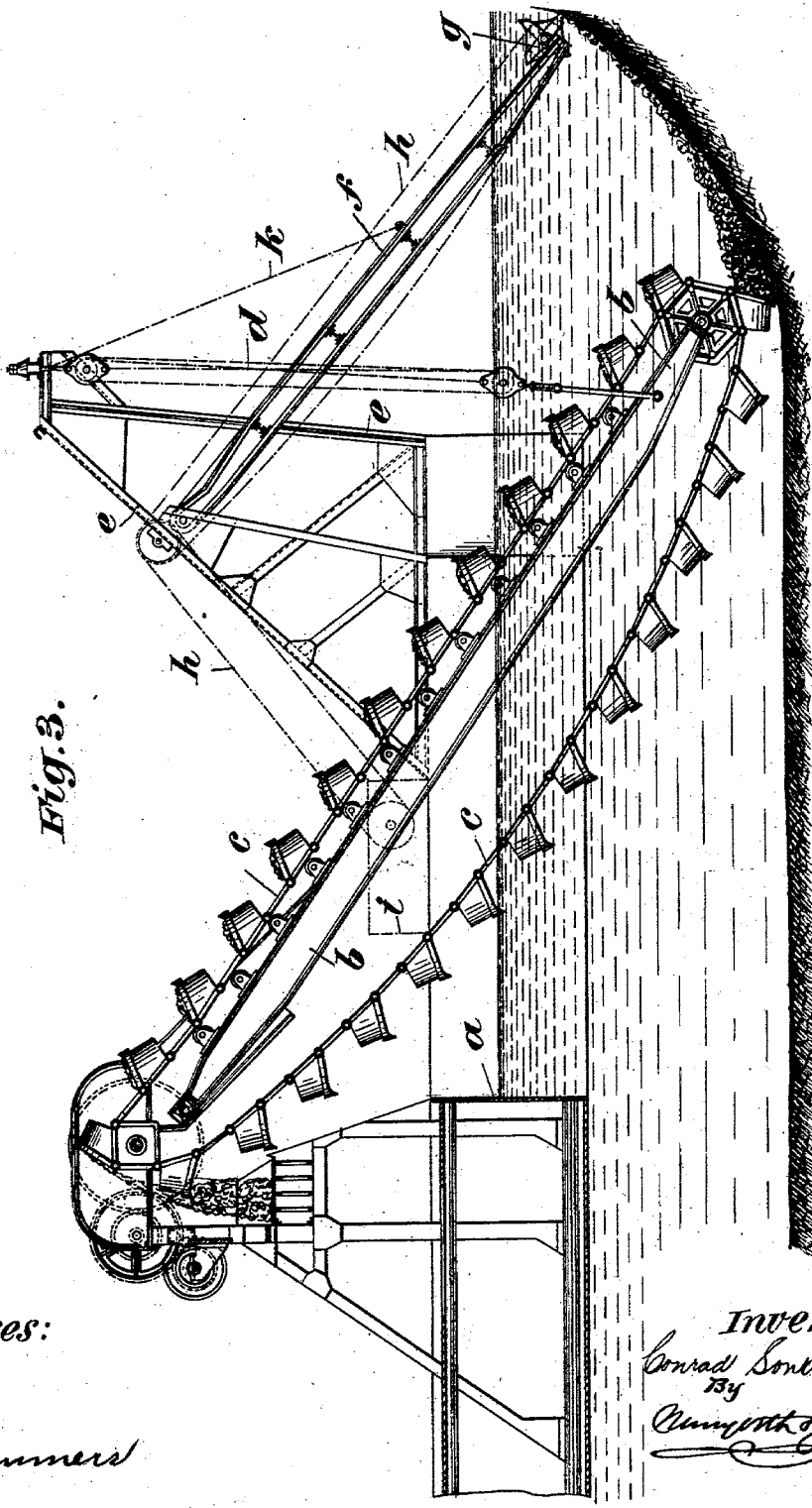

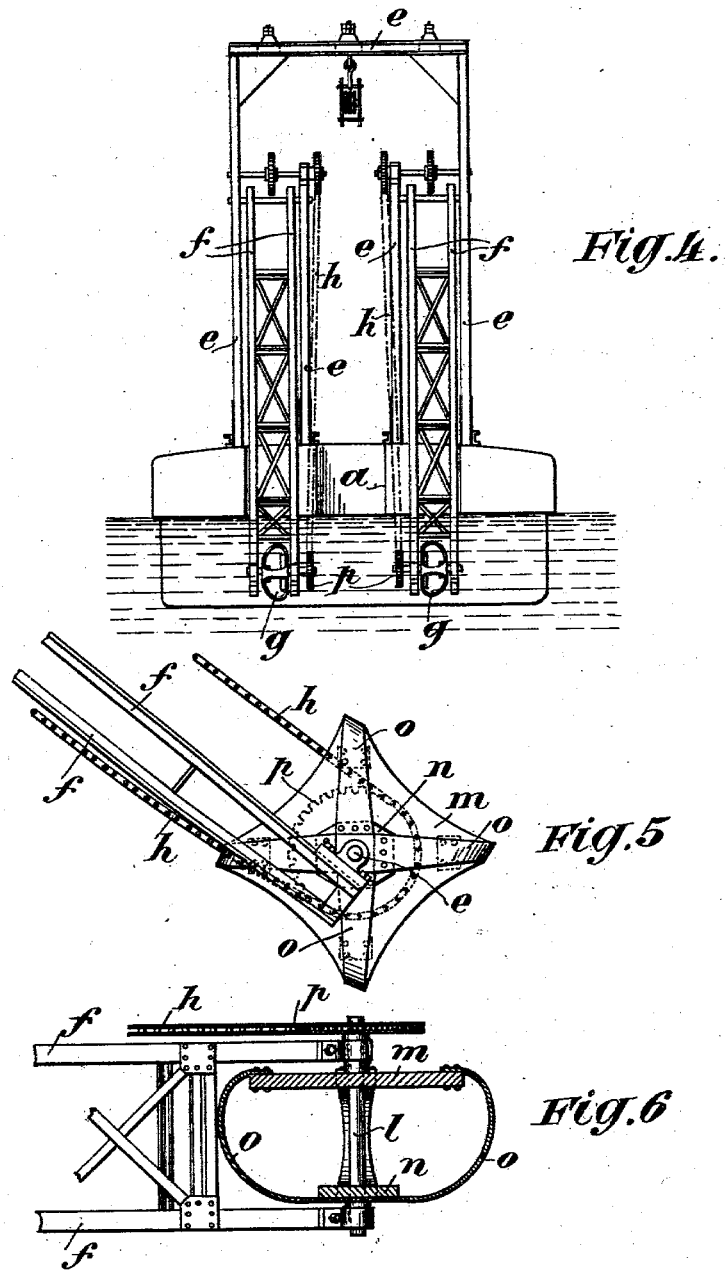

UNITED STATES PATENT OFFICE.

CONRAD SONDEREGGER, OF ZURICH, SWITZERLAND.

DREDGING-MACHINE.

SPECIFICATION forming part of Letters Patent No. 720,749, dated February 17, 1903.

Application filed August 25, 1902. Serial No. 120,983. (No model.)

*To all whom it may concern:*

Be it known that I, CONRAD SONDEREGGER, a citizen of the Republic of Switzerland, residing at Zurich, Switzerland, have invented new and useful Improvements in Dredging-Machines, of which the following is a specification.

On all dredging-machines that have been constructed up to this date the chain of buckets has to do two different kinds of work—it has to loosen the ground and to lift up the loosened material. This double application of the chain of buckets meets with no difficulties where the loosening and lifting up of the ground requires but a small amount of power, as in soft earth, sand, or gravel. In places, however, where the ground is of a rocky constitution the loosening of the material requires a great amount of power and the chain of buckets must be of a strong and heavy construction. This increases the weight of the chain of buckets in a great extent and makes it less practicable for its other purpose—the raising of the material. The overstraining of the machinery when working in rocky ground results in heavy losses of power, frequent interruptions in the management, and costly repairings.

My present invention is an improvement for dredging-machines that enables them to work as well in rocky ground as in loose earth, sand, and gravel without any bad influence on the chain of buckets.

It consists of an implement (extractor) which, working independently of the chain of buckets, takes the function of loosening the ground and leaves to the chain of buckets but the function of raising the loosened material.

The inclosed drawings illustrate the improvement applied to a dredging-boat.

Figure 1:
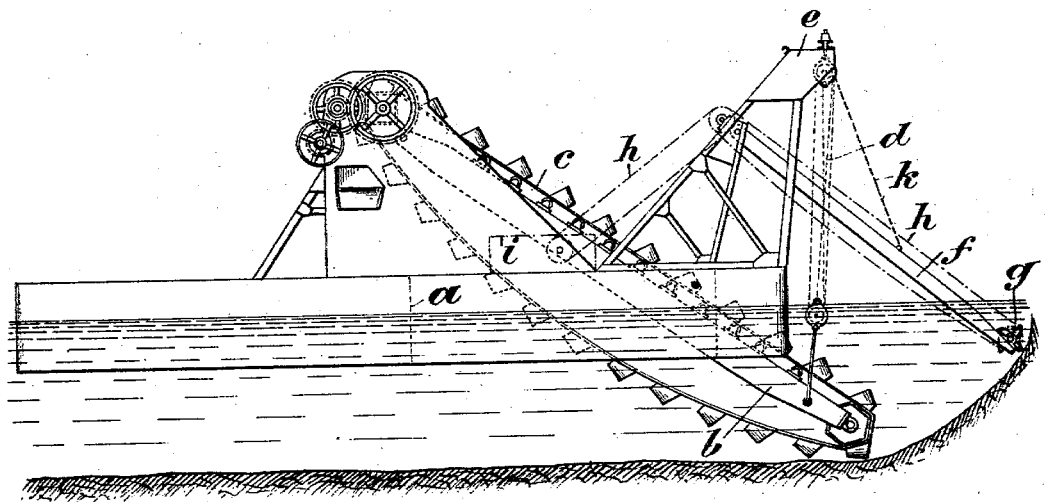
Figure 2:
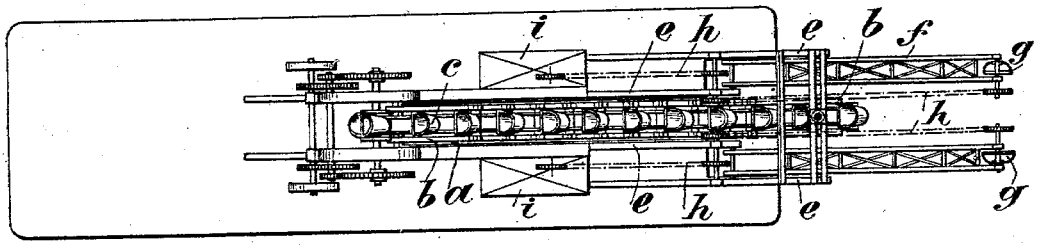

Figure 1 shows a side view; Fig. 2, a horizontal projection, plan; Fig. 3, a longitudinal section, partly a side view; Fig. 4, a head view. Figs. 5 and 6 show several details of the object of invention.

In the open slit $a$, running to the one end of the boat, is suspended on a pulley $d$ the bucket-ladder $b$, which carries the chain of buckets $c$. The pulley $d$ is fastened to a truss $e$, placed at the outer end of the slit $a$. This truss has on both lateral sides of the slit $a$, to the right and to the left of the chain of buckets, inclined stanchions (supports) on which are supported the bearings of the extractor-ladders $f$. On the lower end of these extractor-ladders are the bearings for the extractors. The extractors are put into rotation by the transmission $h$, $i$ indicating the motors which produce the power for the rotation.

The arrangement of the extractor-ladders is analogous the arrangement of the bucket-ladders, as described above. The free end of the ladder is suspended by a pulley $k$, which is fastened to the truss $e$, while the other end is fixed to the truss in a bearing, so that the extractor-ladder can swing up and down.

Figs. 5 and 6 show a view and section of an extractor in a bigger scale. On a shaft $l$, embedded in a bearing fixed to the extractor-ladder, are fastened the collars or wheels $m$ and $n$. To these collars are fastened the knives $o$, made, for instance, of steel. The knives being placed on them in the form of a star are curved out sidewise, shaped like the cutting edge of a dredge-bucket. On the shaft $l$ is mounted the chain-wheel $p$. By the transmission $h$ the shaft $l$ is put into rotation together with the knives.

The dredging-boat described above is operated as follows: The extractors are put into very slow rotation by the powerful motors $i$ and pressed with great force against the rocky ground. The material loosened by the knives of the extractors moves by its own weight to the lowest point in front of the chain of buckets, by which it can then be raised. As already mentioned, the chain of buckets has only to remove the material loosened by the extractors, the overstraining of the chain of buckets and its frequent repairings, as formerly, being eliminated by this improvement.

Having now particularly described and ascertained the nature of my said invention and in what manner the same is to be performed, I declare that what I claim is—

1. In a dredging-machine, the combination with a barge, of two independently-swinging frames mounted thereon, a continuous carrier mounted on one frame, mechanism for operating the carrier, a cutter mounted on the other swinging frame, mechanism for operating the cutter, and means for controlling the position of the carrier and cutter, substantially as and for the purpose specified.

2. In a dredging-machine, the combination with a barge having a slit formed therein at one end, of a swinging frame mounted on the barge near the inner end of the slit, an endless carrier mounted on the frame, mechanism for operating the carrier, a swinging frame mounted at the outer end of said slit, a cutter mounted on said latter frame and mechanism for operating the cutter, substantially as described.

3. In a dredging-machine, the combination with a barge having a slit centrally formed therein at one end, of a support mounted at the inner end of the slit, a frame pivoted to said support and adapted to project into said slit, an endless carrier mounted on the frame, mechanism for operating the carrier, a support at the outer end of the slit, a frame pivoted to the latter support having its free end projecting beyond the carrier, a cutter mounted on said free end, and mechanism for operating the cutter, substantially as and for the purpose specified.

4. In a dredging-machine, the combination with a barge or boat having an open slit centrally formed therein at one end, of a stationary support mounted at the inner end of the slit, a carrier-frame pivoted to the support and projecting beyond the open end of the slit, an endless carrier mounted on said frame, mechanism on the support for rotating the carrier, means for controlling the free end of said carrier-frame, a support at the outer end of the slit, a cutter-frame pivoted to said latter support and having its free end projecting beyond said carrier, a cutter mounted on the free end of the cutter-frame, mechanism for operating the cutter, and means for controlling the position of the cutter, substantially as described.

5. In a dredging-machine, the combination with a barge or boat having an open slit centrally formed therein at one end, of a stationary support centrally mounted at the inner end of the slit, a carrier-frame pivoted to the support and projecting beyond the open end of the slit, pulleys mounted at the ends of the frame, an endless carrier mounted on the pulleys, mechanism for rotating the pulleys, means for controlling the free end of the carrier-frame, supports at the outer end of the slit, a cutter-frame pivoted to the latter support and having its free end projecting beyond the carrier, a cutter mounted on the free end of the cutter-frame, mechanism for operating the cutter, and means for controlling the position of the cutter-frame, substantially as described.

6. In a dredging-machine, the combination with a barge or boat having an open slit centrally formed therein at one end, of a stationary support centrally mounted at the inner end of the slit, a carrier-frame pivoted to the support and projecting beyond the open end of the slit, pulleys mounted at the ends of the frame, an endless carrier mounted on the pulleys, mechanism for rotating the pulleys, a support at the outer end of the slit, parallel cutter-frames pivoted to the latter support, a cutter journaled in the free end of each cutter-frame, mechanism for operating the cutters, and means for controlling the free ends of the carrier and cutter-frames, substantially as described.

7. In a dredging-machine, the combination with a barge or boat having an open slit centrally formed therein at one end, of a stationary support centrally mounted at the inner end of the slit, a carrier-frame pivoted to the support and projecting into and beyond the open end of the slit, pulleys mounted at both ends of the carrier-frame, an endless carrier mounted on the pulleys, mechanism for rotating the pulleys, buckets on the carrier, a trough at the inner end of the slit to receive material discharged from the buckets, a support on the end of the barge near the outer end of the slit, a cutter-frame pivoted in the latter support on each side of the slit, a cutter journaled in the free end of each cutter-frame, mechanism for rotating the cutters, and means for controlling the free ends of the carrier and cutter-frames, substantially as described.

8. A cutter for dredging-machines, comprising a shaft, suitably-spaced plates rigidly secured thereto, and arcuate knife-blades having their ends secured to said plates, substantially as described.

9. A cutter for dredging-machines, comprising a shaft, parallel pointed plates rigidly secured thereto, and arcuate knife-blades mounted on said points and connecting the plates, and means for rotating the shaft, substantially as described.

In testimony whereof I have signed my name to this specification in the presence of two subscribing witnesses.

CONRAD SONDEREGGER.

Witnesses:
M. VEITH,
A. LIEBERKNECHT.